Patented Feb. 8, 1944

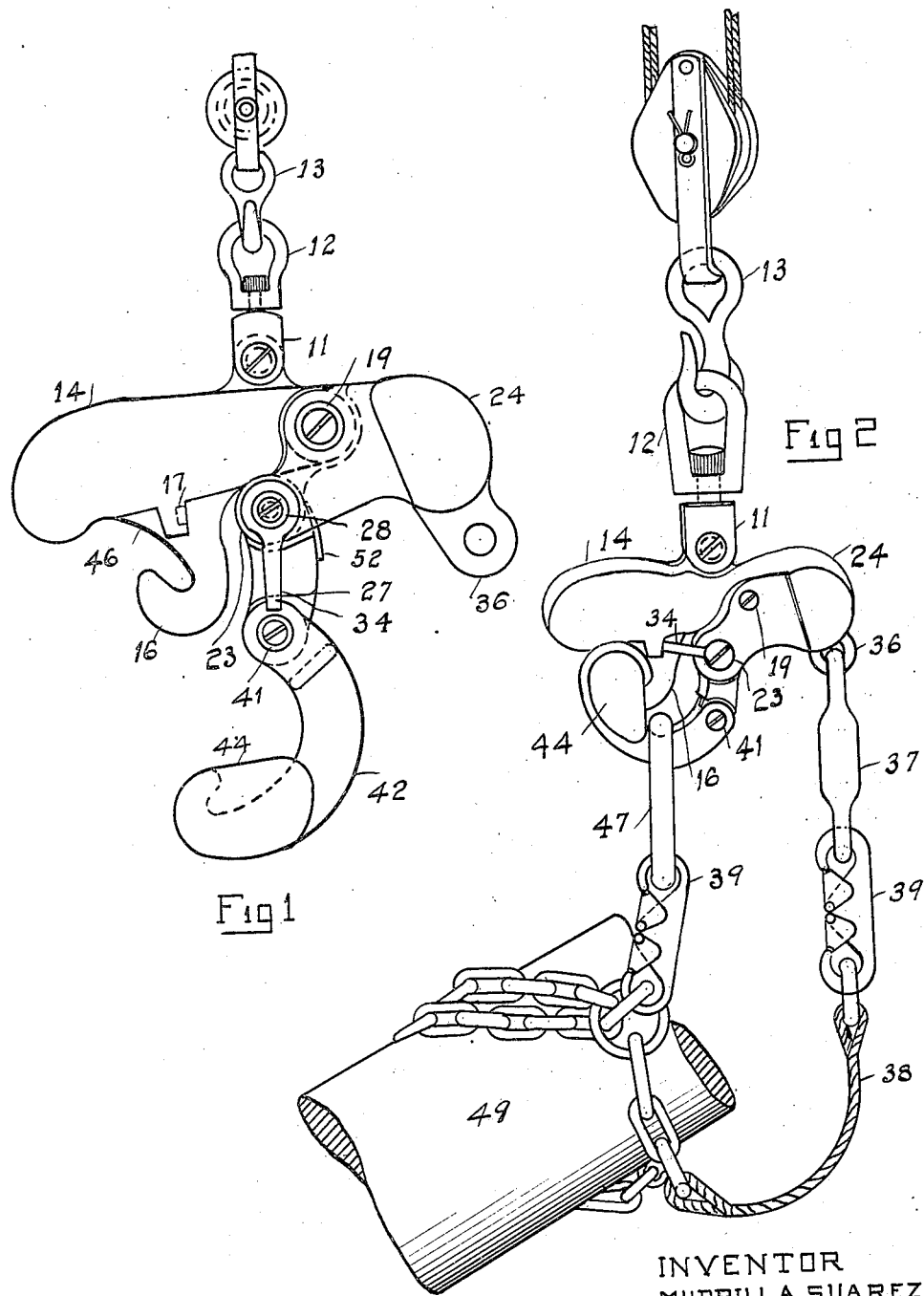

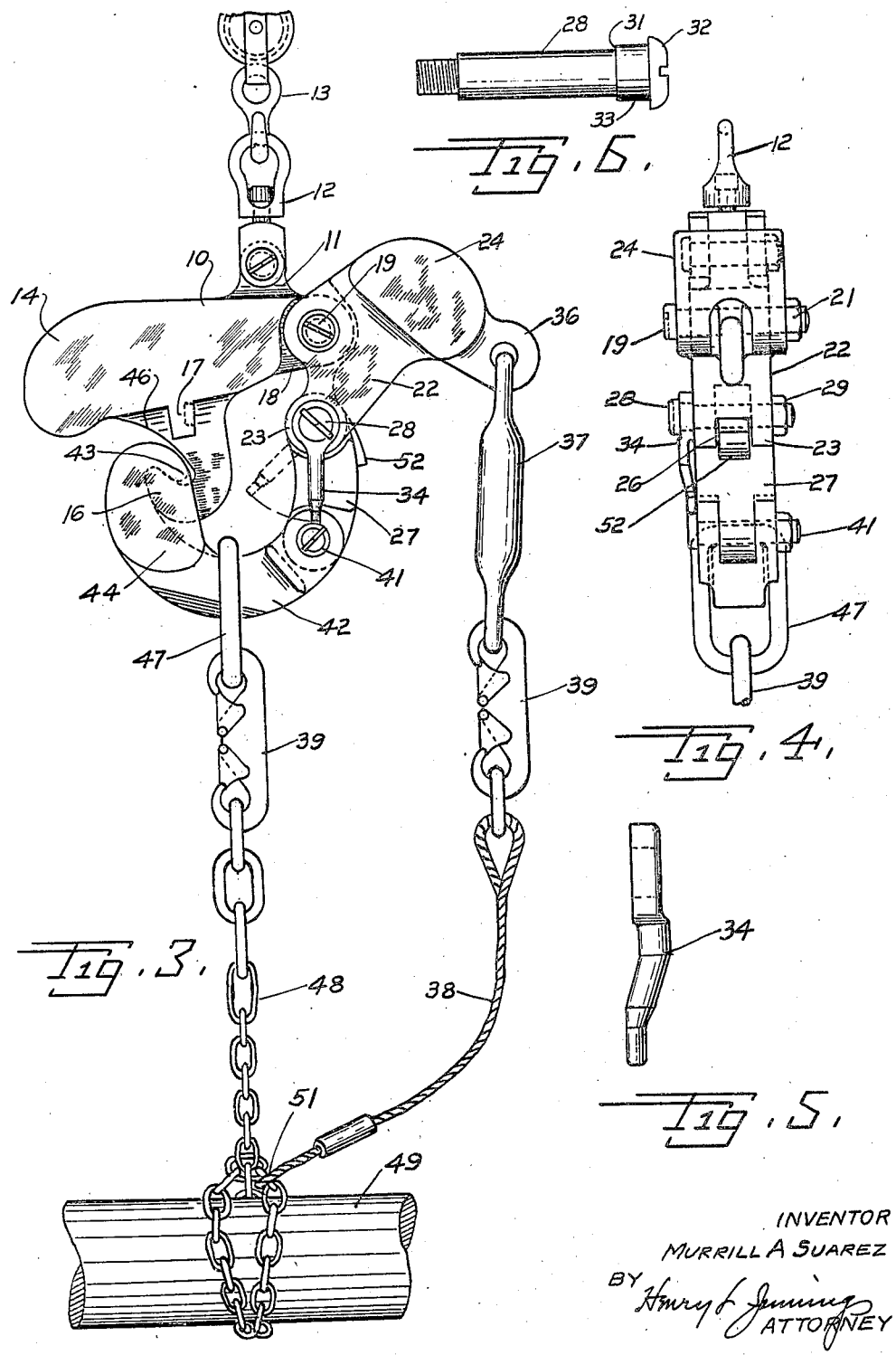

2,340,906

UNITED STATES PATENT OFFICE 2,340,906

SELF-RELEASING SAFETY HOOK

Murrill A. Suarez, Birmingham, Ala.

Application June 11, 1942, Serial No. 446,603

7 Claims. (Cl. 294—83)

My invention relates to a self-releasing safety hook for handling bulky articles, as by a crane, and has for some of its objects the provision of a device of the character described which shall include a safety latch which permits manual engagement of the hook with a load in securing it in place and which drops out of operative position responsive to lifting the load; also a self-releasing device which shall include means for releasing the hook responsive to a predetermined minimum weight sustained thereby; which shall include a sling for attaching the hook to a load and means for withdrawing the sling upon release of the load therefrom.

Self-releasing hooks have heretofore been proposed but so far as I am aware, such hooks which included a safety latch required that the latch be released manually, and such latches could not be released until the strain had already been taken on the load to be handled. Also, where bulky articles were being handled, such as in construction work, or loading or unloading goods from a ship's hold, there was required a manual operation in releasing the load to insure that the sling be returned with the hook. In such handling, articles would often become unbalanced and would slip or fall and endanger the workmen.

In accordance with my invention, I have provided a self-releasing hook which requires manual operation only in attaching the hook to a load. It includes a safety latch which is engaged manually by the workmen when the load is attached to the hook and which is disengaged automatically by the taking of a lifting strain on the load, thereby permitting the automatic release of the hook when the load is deposited. There may also be included a sling for attaching the hook to the article or load being handled, and a carrier line attached to the body of the hook and to the sling, and which serves to disengage the sling from the load, after the hook is released. The sling is thus returned with the hook, to be engaged with another load, without any manual attention or operation. The hook may of course also be used without the sling if desired. I have thus provided an extremely safe device of the character described, and one which is of simple design and economical of manufacture. Other numerous advantages of my invention will become apparent from the accompanying drawings forming a part of this application, illustrating features of my invention, in which Fig. 1 is a view in elevation showing my improved self-releasing hook in open position with no load attached;

Fig. 2 is a perspective view showing my improved self-releasing hook in the act of picking up a load with the safety latch engaged;

Fig. 3 is a view in elevation showing the device after the load is raised and safety latch disengaged;

Fig. 4 is an end elevational view;

Fig. 5 is a detail elevational view of the safety latch pin removed from the device; and Fig. 6 is an elevational view of the pivot pin upon which the safety latch pin is mounted.

Referring to the drawings for a better understanding of my invention, my improved self-releasing hook comprises a main body portion 10 having disposed near one end thereof a lug 11 to which a lifting swivel 12 may be attached for connection to a crane hook or other lifting mechanism indicated by the numeral 13. As shown, the main body portion 10 is of relatively large mass, and is weighted at its outer end 14 so that, as will be better understood from the description which follows, it remains substantially in a horizontal position in use, and thus insures that the force of gravity will act to bring about the proper operation of the device. On the underside of the body portion 10 is provided a hook 16 which is adapted to be engaged by and to hold the load lifting hook to be described later. Also on the underside of the body portion 10 is a safety latch keeper 17. On the end of the body portion 10 opposite the weighted end 14 is a pivot shank 18.

Pivotally mounted on the shank 18 by means of a bolt 19 having a nut 21 on the opposite end thereof, is a second body portion 22. The second body portion 22 is recessed to receive the pivot shank 18, as indicated in the drawings, and is provided on its underside with an extension 23 which extends forwardly to engage the underside of the body portion 10 when the hook is released and the parts are in the position shown in Fig. 1. This feature limits the relative angular motion, in a downward direction, of the parts 10 and 22 to the position shown in Fig. 1. The outer end of the second body portion 22 is provided with a counterweight 24 which counterbalances the weight 14 on the main body portion 10 and causes the parts 14 and 24 to assume a substantially horizontal position, as shown in Fig. 1.

The extension 23 is recessed at 26 to accommodate a link 27 which is pivotally connected to the extension 23 by means of a bolt 28 extending through the device and provided with a nut 29 on its opposite end. See Fig. 4. As shown in Fig. 6 the bolt 28 is provided with a shoulder 31 near its head 32, which engages the side of the extension 23. The portion of the bolt 28 between the shoulder 31 and head 32 provides a bearing 33 for a safety latch pin 34, mounted thereon. The safety latch pin 34, shown in detail in Fig. 5, is loosely mounted on the bearing portion 33 so that when free, it falls by gravity to the position shown in Figs. 1 and 3. Before the load is attached, the pin 34 may be raised manually to the position shown in Fig. 2 to engage the keeper 17. On the outer end of the second body portion 22 is formed a ring 36 for attaching a carrier line. Preferably, a link 37 is connected to the ring 36, which is formed to serve as a convenient handle for manually attaching a carrier line and for operating the hook when engaging a load. The carrier line 38 is connected to the link 37 by means of a snap hook 39. The weights of the main and second body portions, with connecting parts, substantially balance each other so that the body portions naturally assume a position of substantially horizontal alignment as shown in Fig. 1. The force of gravity is thus free to act to bring about automatic operation of the device.

Pivotally connected by mean of a bolt 41 passing through the lower end of the link 27 is the load engaging hook 42. The hook 42 is provided on its outer end with a latch hook 43 which is adapted to be engaged over the hook 16 as shown in Figs. 2 and 3. Cheeks 44 on the sides of the hook 42 serve to prevent the undesired, accidental engagement of the hook 42 with lines or lading. It will be noted by consideration of Figs. 1 and 3 that the shank of the hook 16 is inclined, as shown at 46, to engage the rounded outer surface of the latch hook 43 when the hook 42 is raised and to cause the outer end of the hook 42 to move outwardly and become disengaged and fall by gravity from the latch hook 16.

Adapted to be connected to the load engaging hook 42, as by a link 47, is a load sling 48 which may be engaged about a load to be handled, indicated by the numeral 49. The lower end of the carrier line 38 is connected at 51 to the sling 48 in such a way that when the hook 42 is disengaged from the latch hook 16, the carrier line is then free to pull the sling loose from the load. When this is done the cheeks 44 prevent the hook 43 from being engaged by the link 47. It will be seen that this action requires no manual attention but is entirely automatic upon release of the load from the hook 42.

By reference to Figs. 3 and 4, it will be seen that where the upper end of the link 27 extends into the recess 26 to be connected to the extension 23, I provide a lug 52 which limits the outward angular movement of the link with respect to the second body portion 22. When a load is being raised, as shown in Fig. 3, the hook 42 pulling downwardly causes the bolts 19, 28 and 41 to assume substantially vertically aligned positions. When the load is released, the counter weight 24 causes the outer end of the second body portion 22 to move downwardly and the lug 52 bearing against the bottom of the recess 26 moves the link 27 to the left as viewed in Figs. 1 and 3 of the drawings, and causes the latch hook 43 to move away from, and be disengaged from, the hook 16.

When the device is being engaged with the load, as shown in Fig. 2 of the drawings, the link 37 is grasped by the workman, raising the outer end of the second body portion 22 to permit the hooks 43 and 16 to be engaged. While in its raised position, the safety latch pin 34 is turned to the position shown in Fig. 2 and engaged with the keeper 17. The hooks 43 and 16 are now held in engagement until the load is picked up and the load strain causes the outer end of the second body portion 22 to be rotated to the position shown in Fig. 3 in which the safety latch 34 is released.

From the foregoing description it will be seen that I have devised a self-releasing hook which enables a workman to attach it to a load and move clear of the load before the latter is raised, during which time he is not subjected to danger by reason of shifting or unbalancing of the load when the strain comes on the hook. It will also be seen that when the load is deposited and the weight is relieved on the hook 42, the force of gravity acting on the counterweight 24 and connected parts rotates the link 27 to disengage the hook 43 from the hook 16 and thus release the load. In the design of my improved self-releasing hook, I so proportion the counterweight 24 and connected parts to the weight of the hook 42 that the hook 42 is caused to be released responsive to a predetermined minimum weight on the hook. This can be any predetermined weight desired and may vary with hooks designed to handle articles or lading of different kinds. Ordinarily an amount varying from less than a pound up to a few pounds will be sufficient to provide the necessary safety of operation. Once the hook 42 is released, the sling 48 falls from the hook 42 and the craneman can then raise the device, the carrier line 38 then functioning to pull the sling 48 clear of the load and return it for attachment to another load. My improved device thus facilitates quick loading and unloading, together with an assured safety for the workman.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a device of the character described, a load lifting member, a main body portion having means thereon for attaching a lifting cable or the like, a latch hook on the main body portion for releasably holding one end of the load lifting member, a link connected to the other end of the load lifting member, a second body portion, a pivotal connection between its inner end and said link, a pivotal connection between said second body portion intermediate its ends and said main body portion, and a counter weight on the outer end of the second body portion adapted under predetermined minimum load on the lifting member to raise it off the latch hook.

2. In a device of the character described, a load lifting member, a main body portion having means thereon for connecting a lifting cable or the like, a latch hook on the main body portion for releasably holding one end of the load lifting member, a link connected to the other end of the load lifting member, a second body portion, a pivotal connection between its inner end and said link, a pivotal connection between said second body portion intermediate its ends and said main body portion, and a counter weight on the outer end of the second body portion adapted to overbalance a predetermined minimum load on the lifting member and raise it off the latch hook, a load sling adapted to be attached to the lifting member, and a carrier line connected to the outer end of the second body portion and to the load sling.

3. In a device of the character described, a load lifting member, a main body portion having means thereon for attaching a lifting cable or the like, a latch hook on the main body portion for releasably holding one end of the load lifting member, a link connected to the other end of the load lifting member, a second body portion, a pivotal connection between its inner end and said link, a pivotal connection between said second body portion intermediate its ends and said main body portion, a counter weight on the outer end of the second body portion adapted to overbalance a predetermined minimum load on the lifting member and raise it off the latch hook, a load sling adapted to be attached to the lifting member, a carrier line connected to the outer end of the second body portion and to the load sling, and a safety latch adapted to cooperate between the first and second body portions to hold the load lifting member engaged with the latch hook under said predetermined minimum load conditions and adapted to disengage automatically when said minimum load on the lifting member is exceeded.

4. In a device of the chacarter described, a load lifting member, a main body portion having means thereon for attaching a lifting cable or the like, a latch hook on the main body portion for releasably holding one end of the load lifting member, a link connected to the other end of the load lifting member, a second body portion, a pivotal connection between its inner end and said link, a pivotal connection between said second body portion intermediate its ends and said main body portion, a counter weight on the outer end of the second body portion adapted to overbalance a predetermined minimum load on the lifting member and raise it off the latch hook, a carrier line connected at one end to the outer end of the second body portion, a load sling connected to the carrier line and adapted to be connected to the lifting member, and a safety latch member pivotally connected to the second body portion, and a keeper on the main body portion with which the safety latch is adapted to be engaged and hold the lifting member engaged with the latch hook under said predetermined minimum load conditions.

5. In a device of the character described, a main body portion including an element for attaching a lifting means near one end and a latch hook on the underside thereof, a second body portion pivotally connected to the end of the first body portion adjacent the lifting means, an extension on the second body portion projecting under the main body portion to limit angular movement with respect to said main body portion, counter weight means on the outer end of the second body portion, a link pivotally connected to said extension and having limited angular motion with respect thereto, a releasable hook pivotally connected to the lower end of said link and adapted to be engaged with the latch hook on the main body portion and remain engaged therewith responsive to weight on the releasable hook, and means to suspend a load from said releasable hook.

6. In a device of the character described, a main body portion including an element for attaching a lifting means near one end, a counter weight on the opposite end, and a latch hook on the underside thereof, a second body portion pivotally connected to the end of the main body portion adjacent the lifting means, an extension on the second body portion projecting under the main body portion to limit angular movement with respect to said main body portion, counter weight means on the outer end of the second body portion, a link pivotally connected to said extension and having limited angular motion with respect thereto, a releasable hook pivotally connected to the lower end of said link and adapted to be engaged with the latch hook on the main body portion and remain engaged therewith responsive to weight on the releasable hook, a load supporting sling adapted to be connected to said load hook, a carrier line connecting said load sling and the second body portion, the pivot points of said body portions and the upper and lower ends of said link being vertically out of alignment to release the load hook when a predetermined minimum load is on the releasable hook due to the effect of gravity acting on the counter weight, and tending toward vertical alignment responsive to a load on the releasable hook in excess of said predetermined minimum.

7. A device as defined in claim 6, in which the main body portion and second body portion are so proportioned that they are in substantial balance.

MURRILL A. SUAREZ.